(12) United States Patent
Kim et al.

(10) Patent No.: US 12,394,795 B2
(45) Date of Patent: Aug. 19, 2025

(54) LITHIUM SECONDARY BATTERY AND METHOD OF FABRICATING ANODE FOR LITHIUM SECONDARY BATTERY

(71) Applicant: SK ON CO., LTD., Seoul (KR)

(72) Inventors: Ji Hyung Kim, Daejeon (KR); Young Ha Kim, Daejeon (KR); Sang Bin Lee, Daejeon (KR); Ho Jin Hwang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/674,931

(22) Filed: May 27, 2024

(65) Prior Publication Data

US 2024/0313221 A1    Sep. 19, 2024

Related U.S. Application Data

(62) Division of application No. 18/336,622, filed on Jun. 16, 2023, now Pat. No. 12,034,166.

(30) Foreign Application Priority Data

Jun. 28, 2022    (KR) .................. 10-2022-0078844

(51) Int. Cl.
*H01M 4/62* (2006.01)
*H01M 4/04* (2006.01)
*H01M 4/66* (2006.01)
*H01M 10/0525* (2010.01)

(52) U.S. Cl.
CPC ............ *H01M 4/621* (2013.01); *H01M 4/04* (2013.01); *H01M 4/0404* (2013.01); *H01M 4/661* (2013.01); *H01M 10/0525* (2013.01)

(58) Field of Classification Search
CPC ........ H01M 4/621; H01M 4/04; H01M 4/661; H01M 10/0525; H01M 4/0404; H01M 4/13; H01M 4/139; H01M 10/052; H01M 10/058; H01M 10/0585
See application file for complete search history.

(56) References Cited

U.S. PATENT DOCUMENTS

2018/0159114 A1* 6/2018 Tanihara ............... H01M 4/139
2021/0167391 A1* 6/2021 Jo ......................... H01M 4/134

* cited by examiner

*Primary Examiner* — Stewart A Fraser
(74) *Attorney, Agent, or Firm* — IP & T GROUP LLP

(57) ABSTRACT

A lithium secondary battery includes a cathode including a cathode current collector and a cathode active material layer formed on the cathode current collector, and an anode including an anode current collector and an anode active material layer formed on the anode current collector. The anode active material layer has an area larger than that of the cathode active material layer. The anode active material layer includes an overlapping portion overlying the cathode active material layer in a planar direction and a margin portion around the overlapping portion. The margin portion has an electrical resistance greater than that of the overlapping portion.

6 Claims, 4 Drawing Sheets

LITHIUM SECONDARY BATTERY AND METHOD OF FABRICATING ANODE FOR LITHIUM SECONDARY BATTERY

CROSS-REFERENCE TO RELATED APPLICATION AND CLAIM OF PRIORITY

This application is a division of U.S. patent application Ser. No. 18/336,622 filed on Jun. 16, 2023, which claims priority to Korean Patent Applications No. 10-2022-0078844 filed on Jun. 28, 2022 in the Korean Intellectual Property Office (KIPO), the entire disclosure of which is incorporated by reference herein.

BACKGROUND

1. Field

The disclosures of this application relate to a lithium secondary battery and a method of fabricating an anode for a lithium secondary battery.

2. Description of the Related Art

A secondary battery which can be charged and discharged repeatedly has been widely employed as a power source of a mobile electronic device such as a mobile phone, a laptop computer, etc.

A lithium secondary battery is widely developed and applied among various types of secondary batteries due to high operational voltage and energy density per unit weight, a high charging rate, a compact dimension, etc.

For example, the lithium secondary battery may include an electrode assembly including a cathode, an anode and a separation layer interposed between the cathode and the anode, and an electrolyte solution immersing the electrode assembly.

The cathode may include a cathode current collector and a cathode active material layer formed on the cathode current collector. The cathode active material includes a cathode active material such as lithium metal oxide particles. The anode may include an anode current collector and an anode active material layer formed on the anode current collector. The anode active material layer includes an anode active material such as graphite.

Insertion and deintercalation of lithium ions are repeated in the cathode active material layer and the anode active material layer, and charging and discharging of the lithium secondary battery may proceed.

If the anode active material layer accommodates only a portion of the lithium ions desorbed from the cathode active material layer, some lithium ions may be deposited on a surface of the anode active material layer. Accordingly, performance at the anode may be deteriorated and life-span of the lithium secondary battery may be degraded.

SUMMARY

According to an aspect of the present disclosures, there is provided a lithium secondary battery having improved operational stability and reliability.

According to an aspect of the present disclosures, there is provided a method of fabricating an anode for a lithium secondary battery having improved operational stability and reliability.

A lithium secondary battery includes a cathode including a cathode current collector and a cathode active material layer formed on the cathode current collector, and an anode including an anode current collector and an anode active material layer formed on the anode current collector. The anode active material layer has an area larger than that of the cathode active material layer. The anode active material layer includes an overlapping portion overlying the cathode active material layer in a planar direction and a margin portion around the overlapping portion. The margin portion has an electrical resistance greater than that of the overlapping portion.

In some embodiments, the margin portion may surround the overlapping portion and may not overlap the cathode active material layer in the planar direction.

In some embodiments, a ratio of the electrical resistance of the margin portion relative to the electrical resistance of the overlapping portion may be in a range from 1.05 to 4.

In some embodiments, the anode active material layer may include an anode active material and a binder, and a binder content in the margin portion may be greater than a binder content in the overlapping portion.

In some embodiments, a ratio of the binder content in the margin portion relative to the binder content in the overlapping portion may be in a range from 1.1 to 5 on a weight basis.

In some embodiments, a ratio of an area of the overlapping portion relative to a total area of the anode active material layer in the planar direction may be in a range from 0.8 to 0.99.

In some embodiments, a ratio of a width of the margin portion formed at one side of the overlapping portion relative to a width of the anode active material layer in a cross-section of the anode active material layer in a width direction may be in a range from 0.002 to 0.1.

In some embodiments, a ratio of a width of a margin portion formed at one side of the overlapping portion relative to a width of the anode active material layer in a cross-section of the anode active material layer in a length direction may be in a range from 0.001 to 0.02.

In some embodiments, a width of the margin portion may be in a range from 1 mm to 2 mm in the planar direction.

In some embodiments, the anode active material layer may have a thickness from 50 μm to 300 μm.

In a method of fabricating an anode for a lithium secondary battery, an anode current collector having an anode active material layer region is prepared. A binder layer is formed on the anode current collector along an outer portion of the anode active material layer region. An anode slurry layer containing an anode active material and a binder is formed on a surface of the anode current collector in the anode active material layer region and on the binder layer.

In some embodiments, the binder layer and the anode slurry layer may be dried.

In some embodiments, a margin portion in which the binder layer and the anode slurry layer on the binder layer becomes integral may be formed in the drying.

According to example embodiments, deposition of lithium on a surface of an anode active material layer may be suppressed during an operation of a lithium secondary battery. Accordingly, life-span of the lithium secondary battery may be improved.

DETAILED DESCRIPTION OF THE EMBODIMENTS

According to example embodiments, a lithium secondary battery including an anode active material layer that includes regions having different electrical resistances is provided.

Hereinafter, a lithium secondary battery according to example embodiments of the present disclosures will be described in detail with reference to the drawings. However, the drawings and embodiments herein are intended to provide examples, and the concepts and the spirits of the present disclosures is not limited thereto.

Figure 2:
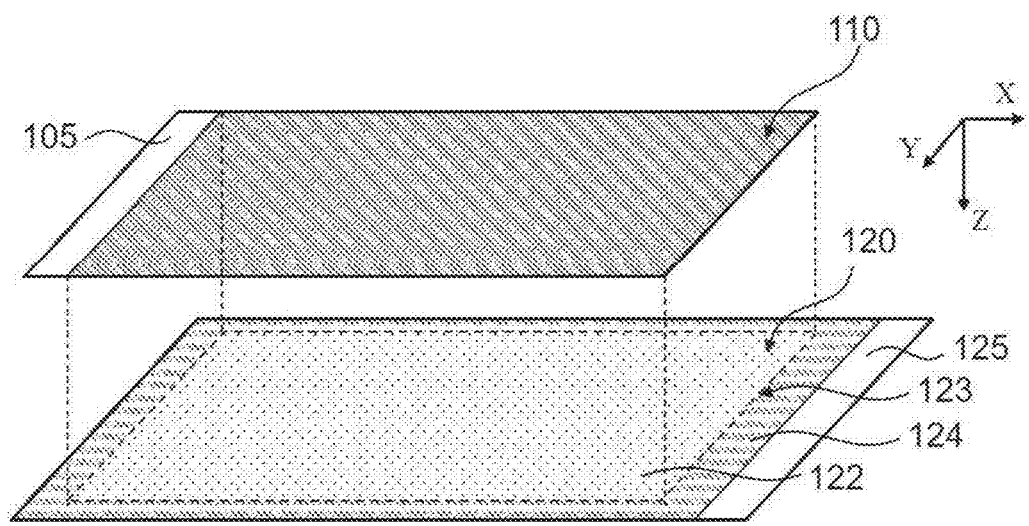
FIG. 2 is an exploded perspective view illustrating constructions of an anode and a cathode in accordance with an example embodiment.

The term "planar direction" used herein refers to a direction in which a cathode and an anode are stacked (e.g., a Z-direction in FIG. 2).

The term "width direction" used herein of an electrode (the cathode or the anode) active material layer is a direction (e.g., a Y direction of FIG. 2) in which the shortest side (or a short axis) of sides of the electrode active material layer extends when viewed in the planar direction. The term "cross-section in the width direction" refers to a cross-section of the electrode active material layer when the electrode active material layer is cut in the width direction (e.g., along a YZ plane of FIG. 2). The "width direction" may be defined based on a surface of the electrode active material layer in the planar direction.

The term "length direction" used herein of the electrode (the cathode or the anode) active material layer refers to a direction (e.g., an X direction of FIG. 2) in which the longest side (or a long axis) of sides of the electrode active material layer extends when viewed from the planar direction. The term "cross-section in the length direction" may refer to a cross-section of the electrode active material layer when the electrode active material layer is cut in the length direction (e.g., along an XZ plane of FIG. 2). The "length direction" may be defined based on the surface of the electrode active material layer in the planar direction.

Figure 1:
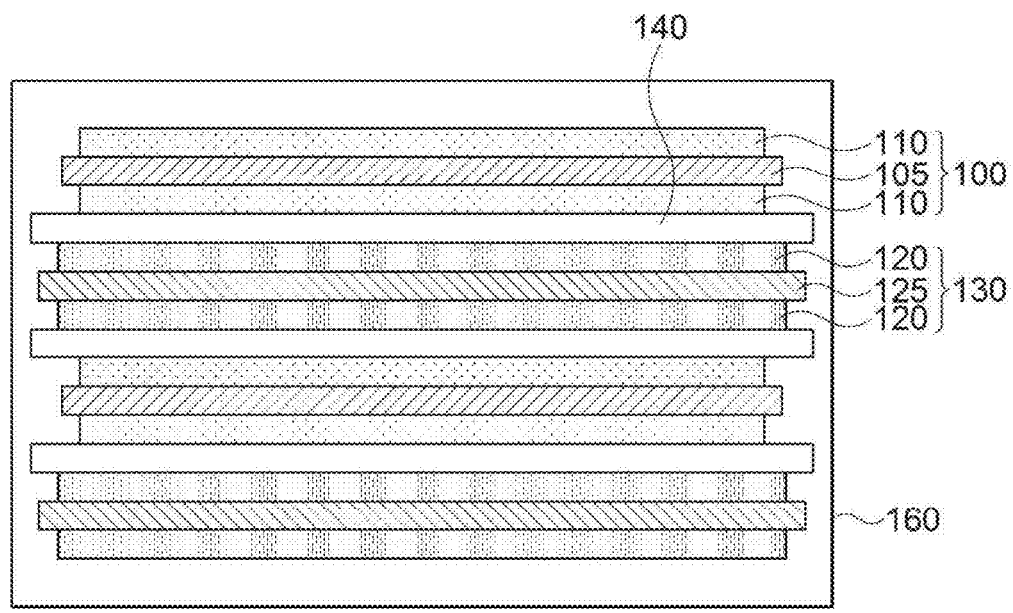
FIG. 1 is a schematic cross-sectional view of a lithium secondary battery in accordance with an example embodiment.

FIG. 1 is a schematic cross-sectional view of a lithium secondary battery in accordance with an example embodiment. FIG. 2 is an exploded perspective view illustrating constructions of an anode and a cathode in accordance with an example embodiment.

Referring to FIGS. 1 and 2, a lithium secondary battery according to an embodiment may include a cathode 100 and an anode 130 facing the cathode 100.

The cathode 100 may include a cathode current collector 105 and a cathode active material layer 110 formed on the cathode current collector 105. For example, the cathode active material layer 110 may be formed on one surface or both surfaces of the cathode current collector 105.

For example, the cathode active material layer 110 may include a cathode active material capable of reversibly intercalating and de-intercalating lithium ions. In some embodiments, the cathode active material layer 110 may further include a binder and a conductive material.

The anode 130 may include an anode current collector 125 and an anode active material layer 120 formed on the anode current collector 125. For example, the anode active material layer 120 may be formed on one surface or both surfaces of the anode current collector 125.

For example, the anode active material layer 120 may include a anode active material capable of reversibly intercalating and de-intercalating lithium ions. In some embodiments, the anode active material layer 120 may further include a binder and a conductive material.

When viewed in the planar direction, an area of the anode active material layer 120 may be greater than that of the cathode active material layer 110. Accordingly, the anode active material layer 120 may entirely cover the cathode active material layer 110.

When the anode active material layer may accommodate only a portion of the lithium ions desorbed from the cathode active material layer, some lithium may be precipitated on a surface of the anode active material layer. As a result, the anode may be deteriorated and a life-span of the lithium secondary battery may be lowered.

According to example embodiments of the present disclosures, the anode active material layer 120 may include a region where the anode active material layer 120 does not face the cathode active material layer 110 (hereinafter, referred to as a non-facing portion) and a region facing the cathode active material layer 110 (hereinafter, referred to as a facing portion), so that more lithium ions may be accommodated in the anode active material layer 120 than those in the cathode active material layer 110. Accordingly, the precipitation of lithium may be suppressed.

However, if the charged lithium secondary battery is left for a specific period, some of the lithium ions inserted into the facing portion may be diffused to the non-facing portion. Accordingly, lithium may be locally precipitated around a boundary between the facing portion and the non-facing portion.

According to example embodiments, the anode active material layer 120 may include a margin portion as described below to effectively suppress the lithium precipitation.

Figure 3:
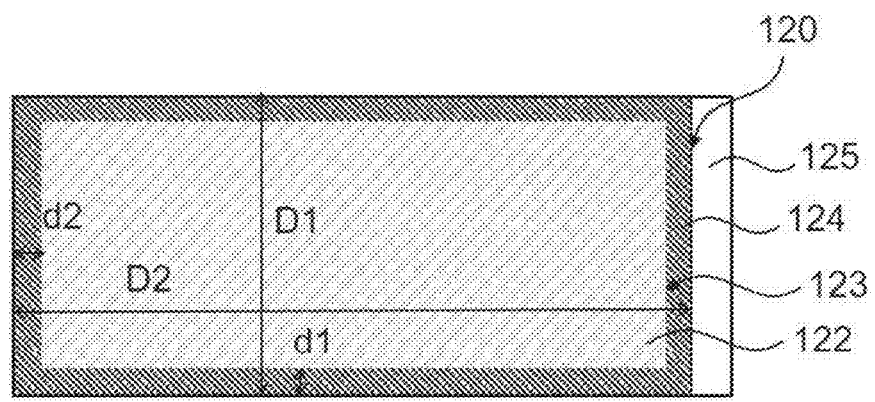
FIG. 3 is a schematic plan view of an anode in accordance with an example embodiment.

FIG. 3 is a schematic plan view of an anode in accordance with an example embodiment.

Referring to FIGS. 2 and 3, the anode active material layer 120 may include an overlapping portion 122 covered by the cathode active material layer 110 in the planar direction and a margin portion 124 having a high electrical resistance than that of the overlapping portion and being formed around the overlapping portion 122.

In one embodiment, the margin portion 124 may surround the overlapping portion 122 along a periphery of the overlapping portion 122.

In one embodiment, the margin portion 124 may not overlap the cathode active material layer 110 in the planar direction. For example, the overlapping portion 122 may face the cathode active material layer 110, and the margin portion 124 may not face the cathode active material layer 110.

The electrical resistance of the margin portion 124 may be greater than that of the overlapping portion 122, so that diffusion of the lithium ions may be suppressed. Accordingly, a local lithium precipitation may be suppressed.

In one embodiment, a ratio of the electrical resistance of the margin portion 124 to the electrical resistance of the overlapping portion 122 may be in a range from 1.005 to 4, 1.05 to 4, from 1.1 to 3.5, from 1.2 to 3.5, from 1.3 to 3.5, from 1.4 to 3.5, from 1.5 to 3.5, or from 1.7 to 3.2 at room temperature (25° C.). Within this range, the local lithium precipitation may be further suppressed.

For example, the electrical resistances of the margin portion 124 and the overlapping portion 122 may be adjusted to be different from each other by adjusting a binder content of the margin portion 124 and a binder content of the overlapping portion 122 to be different from each other. For example, the electrical resistance may be adjusted by controlling the binder content, so that an overall process can be simplified as will be described below. Additionally, a difference in physical properties between the margin portion 124 and the overlapping portion 122 may be reduced, so that deterioration of the anode 130 may be suppressed.

In one embodiment, the binder content based on a weight in the margin portion 124 may be greater than that in the overlapping portion 122. Thus, the electrical resistance of the margin portion 124 may become greater than that of the overlapping portion 122.

In some embodiments, the ratio of the binder content in the margin portion 124 to the binder content in the overlapping portion 122 may be in a range from 1.02 to 5, from 1.05 to 5, 1.1 to 5, from 1.1 to 3, from 1.2 to 2.5 or from 1.2 to 1.8 on a weight basis.

In one embodiment, the binder content included in the overlapping portion 122 may be from 0.1 about weight percent (wt %) to about 5 wt % based on a total weight of the overlapping portion 122. In one embodiment, the binder content included in the margin portion 124 may be from about 0.11 wt % to about 5.5 wt % based on a total weight of the margin portion 124.

In one embodiment, a ratio of a volume (or an area) of the overlapping portion 122 to a total volume (or an area) of the anode active material layer 110 may be from 0.8 to 0.99, from 0.85 to 0.97, or from 0.9 to 0.95. The area may refer to an area in the planar direction. Within the above range, reduction of an energy density of the lithium secondary battery due to the margin portion 124 may be prevented while suppressing the lithium precipitation.

In some embodiments, in a cross-section of the anode active material layer 120 in the width direction, a ratio of a width of the margin portion 124 (d1 of FIG. 3) formed at one side of the overlapping portion 122 relative to a width of the anode active material layer 120 (D1 of FIG. 3) may be in a range from 0.001 to 0.1, from 0.002 to 0.1, from 0.004 to 0.05, from 0.01 to 0.03, or from 0.015 to 0.025. A width of the margin portion 124 formed at the other side of the overlapping portion 122 may also be within the above range.

In some embodiments, in a cross-section in the length direction of the anode active material layer 120, a ratio of a width of the margin portion 124 (d2 in FIG. 3) formed at one side of the overlapping portion 122 relative to a width of the anode active material layer 120 (D2 in FIG. 3) may be in a range from 0.001 to 0.02, from 0.002 to 0.02, from 0.005 to 0.015, or from 0.01 to 0.015. A width of the margin portion 124 formed at the other side of the overlapping portion 122 may also be within the above range.

In some embodiments, the width of each of the margin portions 124 (e.g., d1 and d2 in FIG. 3) may be from about 0.5 mm to 3 mm, from about 0.75 mm to about 2.5 mm, or from about 1 mm to about 2 mm.

In one embodiment, a density of the anode active material layer 120 may be 0.5 g/cc or more, 1.0 g/cc or more, or 1.5 g/cc or more. Further, the density of the anode active material layer 120 may be 4.0 g/cc or less.

In one embodiment, the anode active material layer 120 may have a thickness of about 50 μm to 300 μm.

Figure 4:
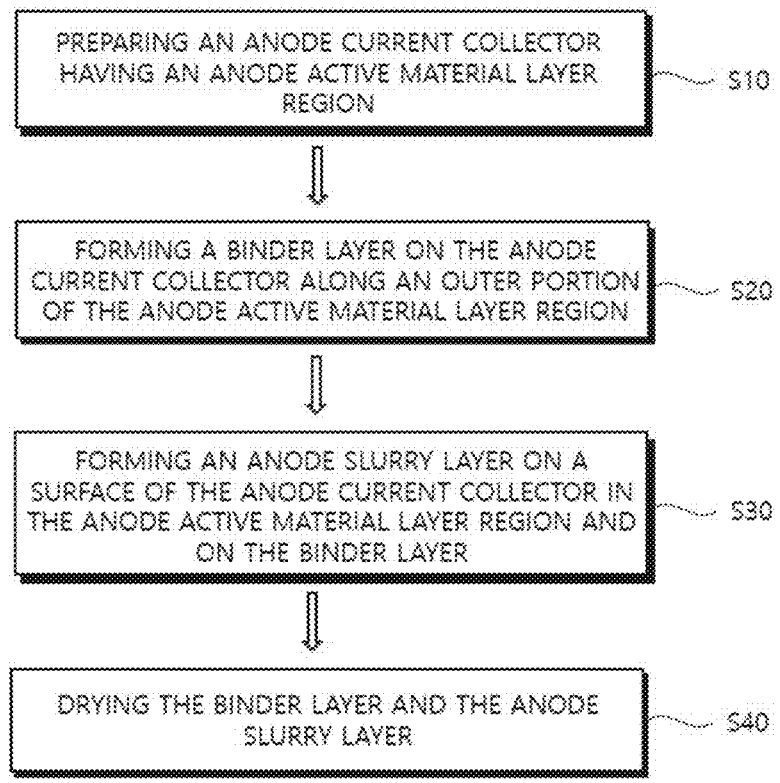
FIG. 4 is a flow diagram describing a method of fabricating an anode in accordance with an example embodiment.
Figure 5:
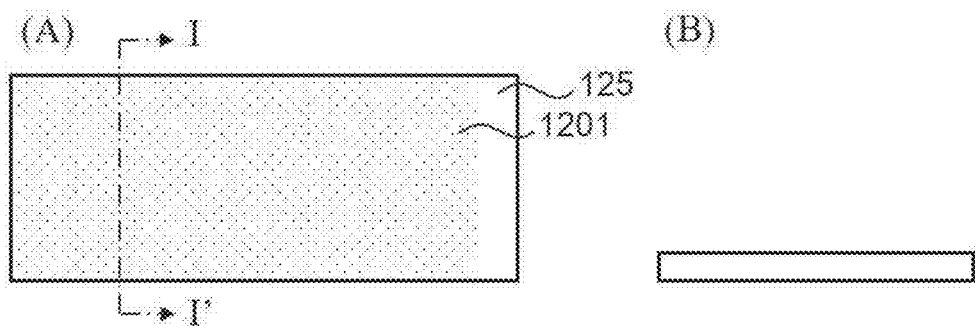
FIGS. 5 to 8 are schematic diagrams illustrating a method of fabricating an anode in accordance with an example embodiment.
Figure 6:
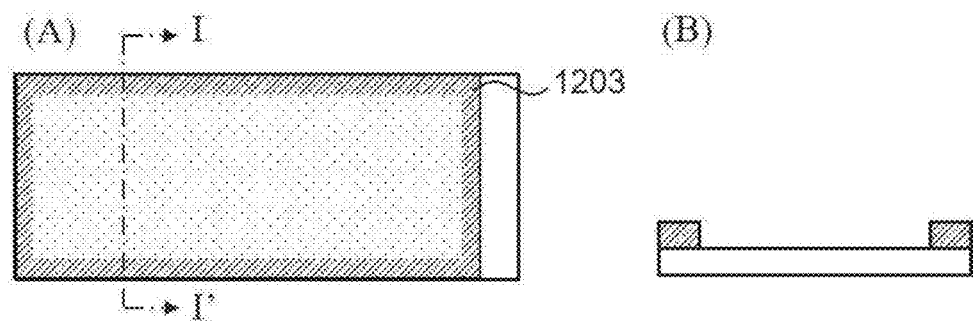
Figure 7:
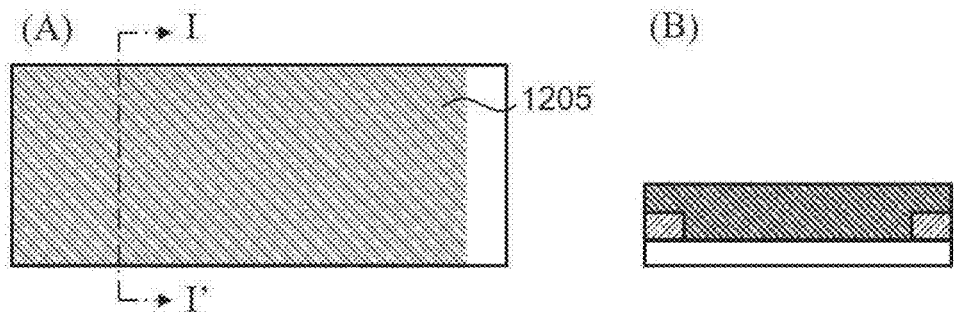
Figure 8:
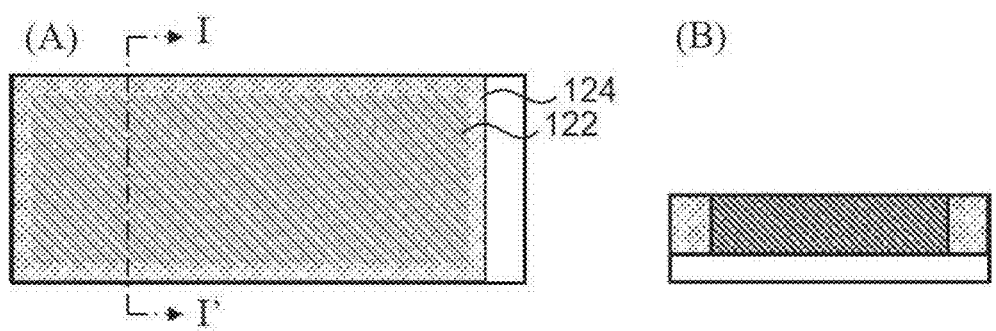

FIG. 4 is a flow diagram describing a method of fabricating an anode in accordance with an example embodiment.

FIGS. 5 to 8 are schematic diagrams illustrating a method of fabricating an anode in accordance with an example embodiment.

FIGS. 5(A), 6(A), 7(A) and 8(A) are schematic plan views illustrating cathodes corresponding to phases S10, S20, S30 and S40 of FIG. 4.

FIGS. 5(B), 6(B), 7(B) and 8(B) are cross-sectional views taken along lines I-I' indicated in FIGS. 5(A), 6(A), 7(A) and 8(A), respectively, along a thickness direction.

Referring to FIGS. 4, 5(A) and 5(B), an anode current collector 125 having an anode active material layer region 1201 may be prepared (e.g., in the phase S10).

Referring to FIGS. 6(A) and 6(B), a binder layer 1203 having a predetermined width may be formed on the anode active material layer region 1201 along an outer portion (e.g., along a periphery) of the anode active material layer region 1201 (e.g., in the phase S20).

In one embodiment, the binder layer 1203 may include the periphery of the anode active material layer region 1201.

For example, a binder composition (e.g., a binder melt, a binder solution, a binder slurry, etc.) may be coated along the outer portion of the anode active material layer region 1201, and may be dried to form the bonder layer 1203.

Referring to FIGS. 7(A) and 7(B), an anode slurry layer 1205 including a anode active material and a binder may be formed on the anode active material layer region 1201 and the binder layer 1203 (e.g., in the phase S30).

For example, the anode slurry may be prepared by mixing and stirring the anode active material, the binder, a dispersion medium, etc. The anode slurry may further include a conductive material.

The binder in the binder layer 1203 and the binder in the anode slurry layer 1205 may be the same as or different from each other.

In one embodiment, the binder in the binder layer 1203 and the binder in the anode slurry layer 1205 may be the same. Accordingly, an adhesive force of the overlapping portion 122 and the margin portion 124 may be further improved.

The cathode slurry layer 1205 and the binder layer 1203 may be dried (e.g., in the phase S40).

Referring to FIGS. 8(A) and 8(B), in the phase S40, the binder layer 1203 may be incorporated into the anode slurry layer 1205. Accordingly, the margin portion 124 in which the binder layer 1203 and the anode slurry layer 1205 on the binder layer 1203 are integrally formed with each other.

In one embodiment, drying of the anode slurry layer 1205 and the binder layer 1203 may be performed at a temperature from about 80° C. to about 200° C.

In a comparative example, a first anode slurry and a second anode slurry having different binder contents may be prepared, and then the first anode slurry and the second anode slurry may be coated at regions corresponding to the overlapping portion 122 and margin portion 124, respectively.

However, according to the above-described embodiments, preparation of different anode slurries having different binder contents may not be needed, and a uniformly leveled anode active material layer can be more easily formed by a simplified process.

For example, the anode current collector 125 may include gold, stainless-steel, nickel, aluminum, titanium, copper or an alloy thereof, preferably, may include copper or a copper alloy.

For example, the anode active material may include a lithium alloy, a carbon-based material, a silicon-based material, etc.

For example, the lithium alloy may include a metal element such as aluminum, zinc, bismuth, cadmium, antimony, silicon, lead, tin, gallium, indium, etc.

For example, the carbon-based active material may include a crystalline carbon, an amorphous carbon, a carbon complex, a carbon fiber, etc.

The amorphous carbon may include, e.g., a hard carbon, cokes, a mesocarbon microbead (MCMB) fired at a temperature of 1500° C. or less, a mesophase pitch-based carbon fiber (MPCF), etc. The crystalline carbon may include, e.g., artificial graphite, natural graphite, graphitized cokes, graphitized MCMB, graphitized MPCF, etc.

In one embodiment, the anode active material may include the silicon-based active material. The silicon-based active material may include, e.g., Si, $SiO_x(0<x<2)$, Si/C, SiO/C, Si-metal, etc.

For example, the binder may include an organic based binder such as polyvinylidenefluoride (PVDF), a vinylidene fluoride-hexafluoropropylene copolymer (PVDF-co-HFP), polyacrylonitrile, polymethylmethacrylate, etc., or an aqueous based binder such as styrene-butadiene rubber (SBR) that may be used with a thickener such as carboxymethyl cellulose (CMC).

The conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

For example, the cathode active material, the binder, the conductive material, a dispersive medium, etc., may be mixed and stirred to prepare a cathode slurry. The cathode slurry may be coated on the cathode current collector 105, and then dried and pressed to form the cathode 100.

For example, the cathode current collector 105 may include stainless steel, nickel, aluminum, titanium, copper, or an alloy thereof.

For example, the cathode active material may include lithium metal oxide particles.

In one embodiment, the cathode active material may include lithium metal oxide particles containing nickel. In some embodiments, the lithium metal oxide particles may further contain cobalt, manganese, aluminum, etc.

In some embodiments, the lithium metal oxide particle may contain 80 mol % or more of nickel among all elements except lithium and oxygen.

In one embodiment, the lithium metal oxide particle may be represented by Chemical Formula 1 below.

Chemical Formula 1

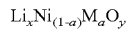

$Li_xNi_{(1-a)}M_aO_y$

In Chemical Formula 1, M may include at least one of Al, Zr, Ti, Cr, B, Mg, Mn, Ba, Si, Y, W and Sr, and $0.9 \leq x \leq 1.2$, $1.9 \leq y \leq 2.1$ and $0 \leq a \leq 0.5$.

In some embodiments, in Chemical Formula 1, $0<a \leq 0.4$, $0<a \leq 0.3$, $0<a \leq 0.2$, $0<a \leq 0.17$, $0<a \leq 0.15$, $0<a \leq 0.12$, $0<a \leq 0.1$.

In one embodiment, a separation layer 140 may be interposed between the cathode 100 and the anode 130.

For example, the separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

For example, an electrode cell may be formed including the anode 100, the cathode 130 and the separation layer 140. A plurality of the electrode cells may be stacked to form an electrode assembly 150.

For example, the electrode assembly 150 may be formed by z-folding, winding, or stacking of the separation layer 140.

Figure 9:
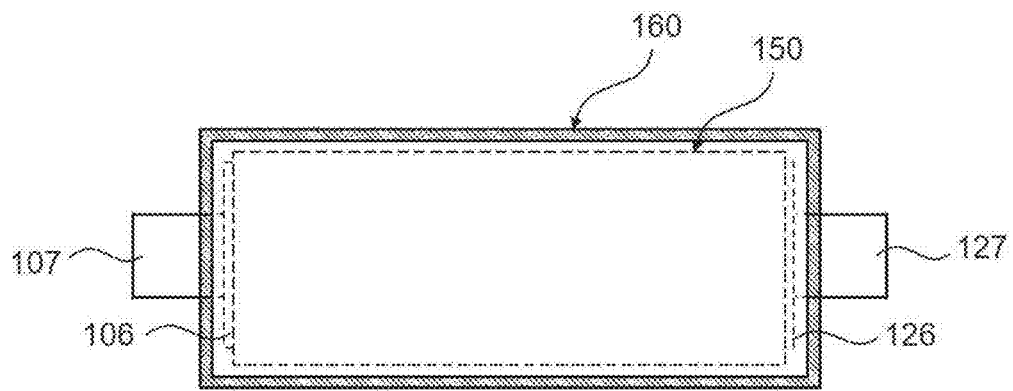
FIG. 9 is a schematic plan view illustrating a lithium secondary battery in accordance with an example embodiment.

FIG. 9 is a schematic plan view illustrating a lithium secondary battery in accordance with an example embodiment.

Referring to FIG. 9, the lithium secondary battery may include a cathode lead 107 connected to the cathode 100 to protrude to an outside of a case 160, and an anode lead 127 connected to the anode 130 to protrude to the outside of the case 160.

For example, the cathode 100 and the cathode lead 107 may be electrically connected to each other. The anode 130 and the anode lead 127 may be electrically connected to each other.

For example, the cathode lead 107 may be electrically connected to the cathode current collector 105. The anode lead 130 may be electrically connected to the anode current collector 125.

The cathode current collector 105 may include a protrusion at one side thereof. For example, the cathode current collector 105 may include a cathode tab 106. The cathode active material layer 110 may not be formed on the cathode tab 106. The cathode tab 106 may be integral with the cathode current collector 105 or may be connected to the cathode current collector 105 by, e.g., welding. The cathode current collector 105 and the cathode lead 107 may be electrically connected via the cathode tab 106.

The anode current collector 125 may include a protrusion at one side thereof. For example, the anode current collector 125 may include an anode tab 136. The anode active material layer 120 may not be formed on the anode tab 126. The anode tab 126 may be integral with the anode current collector 125 or may be connected to the anode current collector 125 by, e.g., welding. The anode electrode current collector 125 and the anode lead 127 may be electrically connected via the anode tab 126.

In one embodiment, the electrode assembly 150 may include a plurality of the cathodes 100 and a plurality of the anodes 130. For example, the cathode 100 and the anode 130 may be alternately arranged, and the separation layer 140 may be interposed between the cathode 100 and the anode 130. Accordingly, the lithium secondary battery according to an embodiment of the present disclosure may include a plurality of the cathode tabs 106 and a plurality of the anode tabs 126 protruding from the plurality of the cathodes 100 and the plurality of the anodes 130, respectively.

For example, the electrode assembly 150 and an electrolyte may be accommodated together in the case to form the lithium secondary battery.

The lithium secondary battery may be fabricated into a cylindrical shape, a prismatic shape, a pouch shape, a coin shape, etc.

Hereinafter, preferred embodiments are proposed to more concretely describe the present disclosures. However, the following examples are only given for illustrating the present disclosures and those skilled in the related art will obviously understand that various alterations and modifications are possible within the scope and spirit of the present disclosures. Such alterations and modifications are duly included in the appended claims.

EXAMPLE 1

(1) Fabrication of Cathode

A cathode slurry was prepared by dispersing $LiNi_{0.8}Co_{0.1}Mn_{0.1}O_2$, polyvinylidene fluoride (PVdF) and carbon black in N-methyl pyrrolidone (NMP) in a weight ratio of 92:4:4.

The cathode slurry layer was formed by applying the cathode slurry on an area of an aluminum foil (12 μm×300 mm×100 mm) except for one end portion in a length direction.

The aluminum foil on which the cathode slurry layer was formed was dried and pressed to prepare a cathode having a cathode active material layer.

(2) Fabrication of Anode

Styrene-butadiene rubber (SBR) was dispersed in distilled water to prepare a binder slurry.

An anode active material in which artificial graphite and natural graphite were mixed in a weight ratio of 7:3, SBR and carboxymethyl cellulose (CMC) were dispersed in distilled water in a weight ratio of 97:1:2 to prepare an anode slurry.

The abode as described with reference to FIG. 3 was fabricated by the process as described with reference to FIGS. 5 to 8.

A copper foil (8 μm×310 mm×110 mm) was prepared. An area excluding one end of the copper foil in the length direction was allocated as an anode active material layer region.

A length of the anode active material layer region was set to be larger than a length of the cathode active material layer by 2 mm, and a width of the anode active material layer region was set to be larger than a width of the cathode active material layer by 2 mm.

The anode active material layer region was divided into a first region located along a periphery of the anode active material layer region and having a width of 1 mm, and a second region surrounded by the first region.

The binder slurry was coated on the first region to form a binder layer (thickness: 10 μm).

The anode slurry was coated on the binder layer and the second region to form an anode slurry layer.

The copper foil on which the binder layer and the anode slurry layer were formed were dried (130° C.) and pressed to prepare an anode having an anode active material layer (thickness: 120 μm).

(3) Fabrication of Lithium Secondary Battery

The cathode, a polyethylene separator (thickness of 20 μm) and the anode were stacked to form an electrode assembly.

The cathode and the anode were stacked so that the second region overlapped the cathode active material layer and the first region did not overlap the cathode active material layer in a planar direction (hereinafter, the anode active material layer on the first region is referred to as a margin portion, and the anode active material layer on the second region is referred to as an overlapping portion).

An anode lead and a cathode lead were connected to one end of the aluminum foil and one end of the copper foil, respectively.

After preparing a 1 M $LiPF_6$ solution (30:70 v/v EC/EMC mixed solvent), 1 wt % of FEC (fluoroethylene carbonate), 0.3 wt % of VC (vinylethylene carbonate), 1 wt % of $LiPO_2F_2$ (lithium difluorophosphate), 0.5 wt % of PS (1,3-propane sultone) and 0.5 wt % of PRS (prop-1-ene-1,3-sultone) based on 100 wt % of a total electrolyte solution were added to prepare an electrolyte solution.

The electrode assembly was housed in a pouch (case) so that partial regions of the cathode lead and the anode lead were exposed to the outside, and three sides except for an electrolyte injection side were sealed.

An electrolyte solution was injected into the pouch and the electrolyte injection side was also sealed to prepare a sample of a lithium secondary battery.

COMPARATIVE EXAMPLE

A lithium secondary battery was fabricated by the same method as that in Example 1, except that the binder layer was not formed in the formation of the anode.

EXAMPLES 2 to 4

A lithium secondary battery was fabricated by the same method as that in Example 1, except that a binder content in the margin portion was adjusted by changing a thickness of the binder layer in the formation of the anode.

EXPERIMENTAL EXAMPLE

(1) Measurement of Electrical Resistance of Marginal and Overlapping Portions The anodes of Examples and Comparative Examples were cut to obtain samples including the marginal portion and samples including the overlapping portion Under conditions of 25° C. and atmospheric pressure (1 atm), an electrical resistance of each sample was measured using a hioki resistance meter. A minute current (1 mA) was applied to the sample through a probe of the resistance meter to measure a potential distribution, and the resistance (volume resistance, (Ω.cm) of the samples was calculated from the potential distribution.

(2) Evaluation on Room Temperature (25° C.) Discharge Capacity

The lithium secondary batteries of Examples and Comparative Examples were 3C CC/CV charged (4.2V 0.05C CUT-OFF) and 0.5C CC discharged (2.5V CUT-OFF).

The charging and discharging were repeated three times, and the discharge capacity was measured at the third cycle.

(3) Evaluation on Lithium Precipitated Amount

The lithium secondary batteries of Examples and Comparative Examples were 3C CC/CV charged (4.2V 0.05C CUT-OFF) and 0.5C CC discharged (2.5V CUT-OFF).

The charging and discharging were repeated 10 times.

After completing the charging and discharging, the lithium secondary batteries was disassembled to separate the anodes.

The separated anode was treated with hydrochloric acid and hydrogen peroxide, and then a heat treatment was performed in a heating block to prepare a test solution.

The test solution was diluted with ultrapure water and filtered. The filtrate was subjected to an ICP emission spectrometry to measure an amount of precipitated lithium precipitated in the filtrate. The amount of lithium precipitation was calculated as a percentage of a lithium content based on a total weight of the filtrate.

TABLE 1

|  | binder content ratio (margin portion/ overlapping portion) | ratio of electrical resistance (margin portion/ overlapping portion) | discharge capacity (mAh/g) | amount of lithium precipitation (wt %) |
|---|---|---|---|---|
| Example 1 | 1.124 | 1.36 | 195.1 | 0.68 |
| Example 2 | 1.25 | 1.72 | 194.9 | 0.56 |
| Example 3 | 1.5 | 2.45 | 195.1 | 0.57 |
| Example 4 | 1.7 | 3.02 | 194.8 | 0.51 |
| Comparative Example | 1 | 1 | 195.0 | 2.3 |

Referring to Table 1, in the lithium secondary batteries of Examples, the amount of lithium precipitation was reduced compared to that of Comparative Example.

What is claimed is:

1. A method of fabricating an anode for a lithium secondary battery, comprising:

preparing an anode current collector having an anode active material layer region;

forming a binder layer on the anode current collector along an outer portion of the anode active material layer region; and forming an anode slurry layer containing an anode active material and a binder on a surface of the anode current collector in the anode active material layer region and on the binder layer, wherein the anode active material layer region includes an overlapping portion overlying the cathode active material layer in a planar direction and a margin portion around the overlapping portion, wherein the margin portion corresponds to the outer portion and does not overlap the cathode active material layer in the planar direction, and wherein the margin portion has an electrical resistance greater than that of the overlapping portion.

2. The method of claim 1, further comprising drying the binder layer and the anode slurry layer.

3. The method of claim 2, wherein the drying comprises forming the margin portion in which the binder layer and the anode slurry layer on the binder layer become integral.

4. The method of claim 3, wherein a binder content in the margin portion is greater than a binder content in the dried anode slurry layer except for the margin portion.

5. The method of claim 2, wherein the drying is performed at a temperature in a range from 80° C. to about 200° C.

6. The method of claim 1, wherein a binder included in the binder layer and the binder included in the anode slurry layer are the same.

* * * * *